United States Patent Office 3,198,832
Patented Aug. 3, 1965

3,198,832
PREPARATION OF TRIAMINOGUANIDINE
Lawrence Elnathan Benjamin, Stamford, Conn., assignor to American Cyanamid Company, Stamford, Conn., a corporation of Maine
No Drawing. Filed Apr. 25, 1963, Ser. No. 275,509
6 Claims. (Cl. 260—564)

This invention relates to the preparation of triaminoguanidine. More particularly, this invention relates to the preparation of triaminoguanidine in the free-base form from triaminoguanidinium salts.

Triaminoguanidine heretofore has been known only in the form of its salts, commonly with mineral acids, although the existence of triaminoguanidine in its free-base form previously has been suggested. By "free-base form" is meant triaminoguanidine having the structural formula $NH_2N=C(NHNH_2)_2$ or $CH_8N_6$.

In application Serial No. 21,559, filed Aprill 11, 1960, by Smalley and Wystrach, and now abandoned, assigned to the assignee of the present application, the preparation of triaminoguanidinium hydroxide by the treatment of acid-addition salts of triaminoguanidine with anion exchange resins is described. Such disclosure is believed to have been the first preparation of a triaminoguanidine compound which would be capable of easy conversion to the free-base form by dehydration. However, due to the instability of triaminoguanidinium hydroxide in the presence of water, the reaction must be performed rapidly and the dehydration must be performed at low temperatures and very rapidly to minimize the formation of decomposition products. To obtain pure triaminoguanidine, such decomposition products as may be formed must be separated, satisfactory techniques for the performance of which are believed unknown.

Accordingly, it is an object of this invention to provide an economical method by which triaminoguanidine may be obtained in high yield and of high purity from the acid-addition salts of triaminoguanidine. Briefly, the above object has been achieved by reacting the triaminoguanidinium salt with an excess of liquid ammonia and separating the insoluble triaminoguanidine from the liquid ammonia.

The reaction between the triaminoguanidinium salts and liquid ammonia occurs rapidly and smoothly, preferably at temperatures of about the boiling point of liquid ammonia or lower, although higher temperatures may be used in pressurized systems. A large excess of anhydrous liquid ammonia normally is used to act as a solvent for the ammonium salt which is a by-product of the reaction and which must be separated from the free-base triaminoguanidine for the production of high purity triaminoguanidine.

The triaminoguanidinium salts useful as starting materials for the preparation of the free-base triaminoguanidine may be any triaminoguanidinium salt such as the chloride, bromide, iodide, nitrate, formate, acetate, etc. The triaminoguanidinium salt is reacted with an excess of liquid ammonia, which excess may be about 4 to 300-fold, and more usually about 10- to 120-fold excess over that liquid required to react stoichiometrically to form the ammonium salt with the acid portion of the triaminoguanidinium salt. This amount of liquid ammonia may be utilized to react with triaminoguanidinium salt as a single batch or in stages. Where such ammonium salt is soluble in liquid ammonia, the excess of liquid ammonia serves as a solvent for the ammonium salt product and facilitates separation of the ammonium salt from the free-base triaminoguanidine which is insoluble. The reaction between the liquid ammonia and the triaminoguanidine salt is conducted at a temperature usually about the boiling point of liquid ammonia at atmospheric pressure. However, the temperature may vary from about $-33°$ C. to $-78°$ C. and more usually about $-33°$ C. to $-40°$ C. Higher temperatures may be used provided super-atmospheric pressures are employed to maintain the ammonia in a liquid state. The time of reaction may vary considerably, however, generally it varies from instantaneous to about three hours and more usually about 30 seconds to about 10 minutes.

The white crystalline free-base triaminoguanidine can readily be separated from the supernatant ammoniacal liquid by the use of filters, centrifuges, hydrocyclones, thickeners, etc. To further improve the purity of the insoluble triaminoguanidine after separation thereof from the supernatant solution in which it was produced, it may be additionally washed with anhydrous liquid ammonia.

The invention is further illustrated, but not limited, by the following examples:

Example 1

This example shows the preparation of triaminoguanidine from triaminoguanidinium chloride prepared in accordance with the Kaiser and Peters United States Patent No. 2,721,218, patented October 18, 1955.

Into a flask containing 0.63 g. (4.48 mmoles) of triaminoguanidinium chloride cooled in a Dry Ice-acetone bath was condensed about 30 ml. of anhydrous ammonia. The cooling bath was then removed and the heterogeneous mixture was stirred while the ammonia was allowed to evaporate. The white solid residue (0.68 g.) was shown by its infrared spectrum to contain triaminoguanidine free-base.

Example 2

This example shows the high yield preparation of high purity triaminoguanidine from triaminoguanidinium chloride on a much larger scale than Example 1.

Into a fritted glass Buchner funnel in a filtering flask was placed 70.3 g. (0.5 mole) of triaminoguanidinium chloride. Approximately 175 g. of anhydrous liquid ammonia was added to the funnel, the mixture was stirred briefly, and the ammonia extract was removed by applying suction to the filtering flask. This treatment with ammonia was repeated until the residue from the filtrate gave a negative test for chloride ion (about six times). The white, solid triaminoguanidine remaining in the funnel, after drying in vacuo, amounted to 42.5 g., 82% of the theoretical quantity.

Example 3

The following example shows the high yield preparation of very high purity triaminoguanidine on a commercial scale.

A ten gallon autoclave was charged with 32.5 lb. of triaminoguanidinium chloride and 25–30 lb. of anhydrous liquid ammonia. The mixture was agitated for several minutes and then the liquid ammonia solution was removed from the insoluble solid. The ammonia treatment was repeated until the removed liquid gave a negative test for chloride ion. The white, crystalline triaminoguanidine remaining in the autoclave amounted to 21 lb. after drying (87% of the theoretical) and was 99.4% pure as determined by electrometric titration. *Analysis.*—Calcd. for $CH_8N_6$: C, 11.54; H, 7.69; N, 80.77. Found: C, 11.87; H, 7.38; N, 80.57.

Many uses are known for certain triaminoguanidinium salts, such as explosives (see Audrieth and Hale, U.S. Patent No. 2,929,699). Such explosive salts can readily be prepared in very high purity from triaminoguanidine as prepared by this invention by the reaction of such triaminoguanidine with the appropriate acidic agent.

I claim:
1. A process for preparing triaminoguanidine which comprises reacting an acid-addition salt of triaminoguanidine with an excess of liquid ammonia free of water at a temperature at which such ammonia is in a liquid state thereby producing free-base triaminoguanidine.
2. A process for preparing triaminoguanidine which comprises reacting an acid-addition salt of triaminoguanidine with an excess of liquid ammonia free of water at a temperature at which such ammonia is in a liquid state and separating insoluble triaminoguanidine from the liquid ammonia.
3. A process for preparing triaminoguanidine which comprises reacting an acid-addition salt of triaminoguanidine with an excess of liquid ammonia free of water at a temperature at which such ammonia is in a liquid state, separating the insoluble triaminoguanidine from the liquid ammonia, and washing the insoluble triaminoguanidine with additional liquid ammonia until substantially free of ions originating from the original triaminoguanidinium salt.
4. A process for preparing triaminoguanidine which comprises reacting an acid-addition salt of triaminoguanidine with an excess of liquid ammonia free of water at a temperature at which such ammonia is in a liquid state and filtering the insoluble triaminoguanidine from the liquid ammonia.
5. A process for preparing triaminoguanidine which comprises reacting triaminoguanidinium chloride with an excess of liquid ammonia free of water at a temperature at which such ammonia is in a liquid state and separating the insoluble triaminoguanidine from the liquid ammonia solution of ammonium chloride.
6. A process for preparing triaminoguanidine which comprises reacting triaminoguanidinium chloride with an excess of liquid ammonia free of water at a temperature at which such ammonia is in a liquid state, filtering the insoluble triaminoguanidine from the liquid ammonia solution of ammonium chloride, washing the triaminoguanidine with liquid ammonia until substantially free of chloride ion, and drying the triaminoguanidine by evaporation of the adhering ammonia therefrom.

References Cited by the Examiner
UNITED STATES PATENTS
2,537,328   1/51   Campbell _____ 260—564

OTHER REFERENCES
Gaiter: C.A., vol. 10, p. 602 (1916).
Lieber et al.: J. Org. Chem., vol. 17, pp. 518–522 (1952).

CHARLES B. PARKER, *Primary Examiner.*